3,523,966
PROCESS FOR PREPARING AROMATIC
ISOCYANATES
Gerhard F. Ottmann and Ehrenfried H. Kober, Hamden,
and David F. Gavin, New Haven, Conn., assignors to
Olin Corporation, a corporation of Virginia
No Drawing. Filed Apr. 1, 1966, Ser. No. 539,322
Int. Cl. C07c *19/04;* B01j *11/12, 11/16*
U.S. Cl. 260—453                        13 Claims

ABSTRACT OF THE DISCLOSURE

The process for preparing an organic isocyanate which comprises reacting an organic nitro compound and carbon monoxide in the presence of a catalytic proportion of a catalyst mixture comprised of a noble metal-based catalyst and a non-noble metal-based catalyst at elevated temperature and elevated pressure. Suitable noble metal-based catalysts include rhodium trichloride, palladium dichloride and platinum dichloride. Suitable non-noble metal-based catalysts include metals such as chromium, molybdenum, nickel alloys, vanadium, germanium, cobalt, silicon, and mixtures thereof.

---

This invention relates to the preparation of organic isocyanates.

There is an increasing demand for organic isocyanates for use in the preparation of urethane foams and coatings, as well as in the preparation of insecticides, pesticides and the like.

The usual commercial process for preparing organic isocyanates requires the catalytic hydrogenation of an organic nitro compound to form the corresponding amine, followed by reaction of the amine with phosgene to form the corresponding isocyanate.

The prior art proposes a process for preparing isocyanates from the corresponding nitro compound by reacting an organic nitro compound with carbon monoxide in the presence of a noble metal-based catalyst. In actual practice, however, when this process is employed to react an organic nitro compound with carbon monoxide using noble metal-based catalyst, such as rhodium trichloride, palladium chloride, iridium trichloride, osmium trichloride and the like, no more than trace amounts of organic isocyanates are obtained, if any are obtained at all.

In view of the expensive techniques available to prepare organic isocyanates, there is a great need in the industry for a simple, economic process for preparing organic isocyanates from the corresponding organic nitro compounds.

It is an object of this invention to provide an improved process for preparing organic isocyanates.

Another object of the invention is to provide a novel catalyst system useful in the direct conversion of organic nitro compounds to the corresponding organic isocyanates.

Still a further object is to provide an improved process for preparing phenyl isocyanate.

It is another object of the invention to provide an improved process for preparing toluene diisocyanates.

Another object of the invention is to provide an improved process for preparing bis(isocyanatophenyl)methanes.

These and other objects of the invention will be apparent from the following description thereof.

It has now been discovered that the above-mentioned objects are accomplished when an organic nitro compound is reacted with carbon monoxide in the presence of a catalyst system comprised of a mixture of a non-noble metal-based catalyst and a noble metal-based catalyst at an elevated temperature and an elevated pressure.

Any organic nitro compound capable of being converted to an organic isocyanate may be employed as a reactant. Generally, aromatic, cycloaliphatic, and aliphatic mono- or poly-nitro compounds having a functionality between 1 and 3 may be reacted to form the corresponding mono- or poly-isocyanates by the novel process of this invention. Typical examples of suitable organic nitro compounds which can be reacted to form isocyanates include the following:

(I) Aromatic Nitro Compounds (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) Nitrocycloalkanes (a) Nitrocyclobutane
(b) Nitrocyclopentane
(c) Nitrocyclohexane
(d) Dinitrocyclohexanes
(e) Bis(nitrocyclohexyl)methanes (III) Nitroalkanes (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrobibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-Dinitro-p-xylene
(22) 2,4,6-5-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) Alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) Alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane In addition, isomers and mixtures of the aforesaid organic nitro compounds and substituted organic nitro compounds may also be employed, as well as homologues and other related compounds. Generally, the organic nitro compounds and substituted organic nitro compounds contain between 1 and about 20, and preferably between about 1 and about 14 carbon atoms.

It has now been discovered that a successful conversion of an organic nitro compound to the corresponding isocyanate can be accomplished in the presence of a catalyst system which is comprised of a mixture of a noble metal-based component (sometimes hereinafter referred to as "catalyst"), and at least one non-noble metal-based component (sometimes hereinafter referred to as "co-catalyst"). Materials suitable for use as the catalyst encompass the so-called noble metals, ruthenium, rhodium, palladium, osmium, iridium and platinum, as well as compounds thereof, such as oxides, sulfides, halides, nitrates, sulfates, carbonates, oxalates and others. Although any of the aforesaid elements or compounds of metals have some effect as the catalyst, component, rhodium trichloride, rhodium dioxide, palladium dichloride, palladium oxide and platinum dichloride are preferably employed as catalysts.

The co-catalysts of this invention encompass the elements of the groups Ib, IIb, IIIa, IIIb, IVa, IVb, VIa, Va, Vb, VIIa, VIII, of the Periodic Table, but exclude the noble metals. These groups are selected from the Periodic Table shown on page 122 of Inorganic Chemistry, by Moeller, John Wiley and Sons, Inc., 1952. The co-catalysts may be employed in elemental form or as compounds thereof, such as iodides, bromides, chlorides, nitrates, sulfates, etc., and certain alloys thereof. When comparing the effectiveness of the co-catalysts, it was found that certain metals, compounds of the metals and certain alloys of such metals had a much greater catalytic effect than others and, therefore, are preferably employed. Those metals, in elemental, compound or alloy form, which are preferred include chromium, silicon, germanium, cobalt, nickel, vanadium, molybdenum, tungsten, and manganese. Compounds thereof include iodides, bromides, chlorides, nitrates, sulfates, sulfides, etc. Among the di- and multi-component alloys, nickel-based alloys such as "Hastelloy B" and "Hastelloy C" (trademarks of Haynes Stellite Co.) are particularly effective as co-catalysts. The average composition of "Hastelloy B" is 64 percent nickel, 28 percent molybdenum, 5 percent iron, 1 percent silicon, 1 percent chromium, 1 percent manganese, and that of "Hastelloy C" is 56 percent nickel, 16 percent chromium, 16 percent molybdenum, 5 percent iron, 4 percent tungsten, 1 percent cobalt, 0.5 percent silicon, 0.5 percent manganese, 0.5 percent vanadium and traces of carbon, phosphorus and sulfur.

Such preferred systems include the following combinations:

(1) Rhodium trichloride+chromium
(2) Rhodium trichloride+chromium trichloride
(3) Rhodium trichloride+silicon
(4) Rhodium trichloride+vanadium
(5) Rhodium trichloride+germanium
(6) Rhodium trichloride+cobalt
(7) Rhodium trichloride+cobalt iodide
(8) Rhodium trichloride+cobalt chloride
(9) Rhodium trichloride+molybdenum
(10) Rhodium trichloride+nickel alloys
(11) Palladium dichloride+cobalt iodide
(12) Palladium dichloride+cobalt chloride
(13) Palldaium dichloride+chromium trichloride
(14) Palladium dichloride+silicon
(15) Palladium dichloride+nickel alloys

(16) Palladium dichloride+chromium
(17) Platinum dichloride+chromium
(18) Platinum dichloride+chromium trichloride
(19) Platinum dichloride+silicon
(20) Platinum dichloride+vanadium
(21) Platinum dichloride+cobalt
(22) Platinum dichloride+cobalt iodide
(23) Platinum dichloride+cobalt chloride
(24) Iridium trichloride+nickel alloys
(25) Osmium trichloride+nickel alloys The various catalyst systems can be self-supported or deposited on a support or carrier for dispersing the metal to increase its reactive surface. Alumina, silica, carbon, barium sulfate, calcium carbonate, asbestos, bentonite, diatomaceous earth, fuller's earth, and analogous materials are useful for said purpose.

The various catalyst systems, capable of effecting the tranformation of an organic nitro compound to an organic isocyanate under the reaction conditions are employed in a catalytic proportion in the process of this invention. The proportion of catalyst system is generally equivalent to between about 0.01 and about 50.0 percent, and preferably between about 0.1 and about 4.0 percent by weight of the organic nitro compound. However, greater or lesser proportions may be employed if desired.

The weight ratio of non-noble metal-based catalyst to noble metal-based catalyst is generally in the range between about 0.1:1 and about 100:1 and preferably in the range between about 1:1 and about 10:1.

The aforementioned process works in the absence of a solvent, and works particularly well in the presence of a solvent which is chemically inert within the system of this invention. A particularly preferred solvent is sulfur dioxide. While the theory of the reaction is not completely understood, it is believed that sulfur dioxide enhances ionization of the nitro groups, eases thereby the abstraction of oxygen, and carries the oxygen to the carbon monoxide which then is converted to carbon dioxide.

When a solvent such as sulfur dioxide is employed in the process of this invention, the proportion is generally equivalent to a molar ratio of moles of sulfur dioxide per mole of organic nitro compound in the range between about 0.05:1 and about 25:1, and preferably between about 0.1:1 and about 10:1.

The order of mixing the reactants is not critical and may be varied within the limitations of the equipment employed. In one embodiment, the organic nitro compound, catalyst system, and, if desired, sulfur dioxide are charged to a suitable pressure vessel such as an autoclave which was previously purged with nitrogen, and which is preferably provided with agitation means such as a stirrer or an external rocking mechanism. Carbon monoxide is fed into the autoclave until a pressure is attained which is in the range between about 40 and about 10,000 p.s.i.g., and preferably between about 100 and about 5000 p.s.i.g., but greater or lesser pressures may be employed if desired.

Generally the quantity of carbon monoxide in the free space of the reactor is sufficient to maintain the desired pressure as well as provide reactant for the process. If desired, additional carbon monoxide can be fed to the reactor either intermittently or continuously as the reaction progresses. The total proportion of carbon monoxide added during the reaction will depend on the volume of free space in the reactor and the pressure desired, but it is generally equivalent to a molar ratio of carbon monoxide to nitro groups in the organic nitro compound in the range between about 0.1:1 and about 50:1, and is preferably between about 0.3:1 and about 20:1.

The reactor is heated by suitable internal or external means to maintain the temperature in the range between about 25° C. up to the decomposition temperature of the isocyanate and preferably between about 150 and about 215° C.

The reaction time is not critical and is generally in the range between about 0.01 and about 48 hours and preferably in the range between about 0.5 and about 4 hours.

After the reaction is completed, the temperature of the crude reaction mixture may be dropped to ambient temperature, the pressure vessel is vented, and the reaction products are removed from the reaction vessel. Filtration or other suitable solid-liquid separation technique may be employed to separate the catalyst from the reaction product, and fractional distillation is preferably employed to isolate the organic isocyanate from the reaction product. However, other suitable separation techniques such as extraction, sublimation, etc. may be employed to separate the organic isocyanate from the unreacted organic nitro compound and any by-products that may be formed.

Organic isocyanates produced in accordance with the technique of this invention are suitable for use in preparing urethane compounds such as foams, coatings, fibers, and the like by reacting the organic isocyanate with a suitable polyether polyol in the presence of a catalyst and, if desired, a foaming agent, and as intermediates for biologically active compounds.

The following examples are presented to further illustrate the invention without any intention of being limited thereby.

EXAMPLE 1

A 300 ml. rocking autoclave was charged with 40 g. (0.33 mole) of nitrobenzene, 0.5 g. of anhydrous rhodium trichloride as catalyst and 0.9 g. of Hastelloy B filings as co-catalyst. The reactor was closed, purged with nitrogen and then with carbon monoxide, and finally pressurized with carbon monoxide to 1450 p.s.i. corresponding to approximately 1.1 moles of carbon monoxide. The reaction mixture was heated to 200° C., and this temperature was maintained for three hours. A maximum pressure of 2300 p.s.i. was observed. The reactor was cooled to room temperature (the pressure at this point was 1150 p.s.i.) and the gases consisting of carbon monoxide and carbon dioxide were released. The reaction product was quantitatively analyzed by infrared spectroscopy and by programmed vapor phase chromatography. The reaction mixture consisted of 18 percent of phenylisocyanate and 81 percent of nitrobenzene. Fractionated distillation of the crude product confirmed the analytical results.

For purposes of comparison, 40 g. (0.33 mole) of nitrobenzene and 0.5 g. of anhydrous rhodium trichloride as catalyst were reacted under the conditions described in Example 1, except that no co-catalyst was employed. This reaction did not afford any trace of phenylisocyanate; nitrobenzene was recovered quantitatively.

EXAMPLE 2

A one liter stirring autoclave was charged with 100 g. (0.83 mole) of nitrobenzene, 1.0 g. of anhydrous rhodium trichloride (catalyst), and 10.0 g. of Hastelloy B (co-catalyst). The reactor was closed, purged with nitrogen and then with carbon monoxide and finally pressurized with carbon monoxide to 100 p.s.i. corresponding to approximately 0.26 mole of carbon monoxide. The stirred reaction mixture was heated at 185° C. for three hours under a maximum pressure of 150 p.s.i. This reaction yielded 1.2 g. of phenylisocyanate which corresponds to a 10 percent uncorrected yield. (In contrast to all other examples, the yield figure in this example is based on the amount of carbon monoxide charged.)

EXAMPLE 3

Amounts of 40 g. (0.33 mole) of nitrobenzene, 0.5 g. of anhydrous rhodium trichloride (catalyst), 10.0 g. of chromium metal powder (co-catalyst) and 1.0 mole (1300 p.s.i.) of carbon monoxide were reacted for three hours at 206° C. By quantitative analysis, the reaction mixture was composed of 6 percent of phenylisocyanate and 94 percent of unreacted nitrozenzene. Thus, the conversion of nitrobenzene was 6 percent, and the corrected yield of phenylisocyanate was 100 percent.

EXAMPLE 4

The reaction of 40 g. (0.33 mole) of nitrobenzene, 0.5 g. anhydrous rhodium trichloride (catalyst), 10 g. of molybdenum metal powder (co-catalyst) with 1.0 mole (1350 p.s.i.) of carbon monoxide for three hours at 204° C. afforded a reaction product consisting of 91.5 percent of nitrobenzene and 4.7 percent of phenylisocyanate.

EXAMPLE 5

The reaction of 15 g. (0.12 mole) of nitrobenzene with 0.43 mole (1525 p.s.i.) of carbon monoxide in presence of 0.2 g. of anhydrous rhodium trichloride (catalyst) and 2.5 g. of fused silicon (co-catalyst) for three hours at 200° C. gave a reaction mixture consisting of 7.6 percent of phenylisocyanate and 92.4 percent of unreacted nitrobenzene.

EXAMPLE 6

The reaction of 40 g. (0.33 mole) of nitrobenzene with 1.0 mole (1290 p.s.i.) of carbon monoxide in presence of 0.5 g. of anhydrous rhodium trichloride (catalyst) and 10 g. of vanadium metal powder gave a reaction mixture which contained 13 percent of phenylisocyanate and 61 percent of nitrobenzene.

EXAMPLE 7

The reaction of 40 g. (0.33 mole) of nitrobenzene with 0.79 mole (1025 p.s.i.) of carbon monoxide in presence of 0.5 g. of anhydrous rhodium trichloride (catalyst) and 10 g. of germanium powder (co-catalyst) for three hours at 200° C. resulted in conversion of nitrobenzene to phenylisocyanate.

EXAMPLE 8

Amounts of 40 g. (0.33 mole) of nitrobenzene, 1.0 mole (1290 p.s.i.) of carbon monoxide, 0.5 g. of anhydrous rhodium trichloride (catalyst) and 1.0 g. cobalt iodide (co-catalyst) were reacted for three hours at 200° C. The reaction product consisted of 6 percent phenylisocyanate and 94 percent of unreacted nitrobenzene.

EXAMPLE 9

The experiment of Example 8 was repeated, but ten times as much catalyst ($RhCl_3$) and ten times as much co-catalyst ($CoI_2$) was employed. This reaction mixture was composed of 21 percent of phenylisocyanate and 79 percent of nitrobenzene.

EXAMPLE 10

The reaction of 15 g. (0.12 mole) of nitrobenzene with 0.42 mole (1575 p.s.i.) of carbon monoxide under the catalysis of 0.2 g. of palladium dichloride and 5.0 g. of chromium metal powder gave a reaction product consisting of 1.8 percent of phenylisocyanate and 98.2 percent of nitrobenzene.

EXAMPLE 11

The experiment of Example 10 was repeated but iridium trichloride and Hastelloy B powder were employed instead of $PdCl_2$ and chromium powder. Conversion of nitrobenzene to phenylisocyanate was established.

EXAMPLE 12

The experiment of Example 10 was repeated but osmium trichloride and Hastelloy B powder were used instead of $PdCl_2$ and chromium powder. Nitrobenzene was substantially converted to phenylisocyanate.

EXAMPLE 13

A 300 ml. autoclave was charged with 40 g. (0.33 mole) of nitrobenzene, 0.5 g. of anhydrous rhodium trichloride, and 0.9 g. of Hastelloy B filings. The reaction vessel was closed, and cooled to −50° C. after air had been replaced by dry nitrogen. Sulfur dioxide (5.6 g., 0.09 mole) was added by means of a pressure transfer cylinder. The autoclave, which then was pressurized with carbon monoxide to 1400 p.s.i. (approximately 1.1 moles), was heated to 214° C. (the pressure was at this temperature 1900 p.s.i.) and kept at this temperature for three hours. After cooling to room temperature, the gases were vented and the liquid content distilled. The reaction afforded 6.6 g. of phenylisocyanate (100 percent corrected yield) and 33.0 g. of nitrobenzene (corresponding to a 16.5 percent conversion).

EXAMPLE 14

An 1180 ml. autoclave was charged with 100 g. (0.81 mole) of nitrobenzene, 118.5 g. (1.85 moles) of sulfur dioxide, 1.0 g. of anhydrous rhodium trichloride, 1.0 g. of anhydrous cobalt chloride, and 2.0 g. of Hastelloy B filings. The autoclave was pressurized with carbon monoxide to 1000 p.s.i. (approximately 2.9 moles). The reactor was heated for three hours at 200° C. with rocking. The reaction afforded 10.5 g. of phenylisocyanate (100 percent corrected yield) and 89 g. of nitrobenzene (corresponding to a 10.5 percent conversion).

Conversion of dinitro toluene to toluene diisocyanate and conversion of 4,4'-dinitro diphenylmethane to 4,4'-diisocyanto diphenylmethane may also be obtained in accordance with the procedure similar to those of Examples 1–14.

Various modifications of the invention, some of which have been referred to above, can be made without departing from the spirit of the invention. What is desired to be secured by Letters Patent is:

1. A process for preparing an aromatic isocyanate by reacting an aromatic nitro compound containing up to 20 carbon atoms with carbon monoxide at an elevated temperature and an elevated pressure in the presence of a catalyst which comprises employing as said catalyst a catalyst mixture of
    (A) a noble metal-based catalyst of
        (1) ruthenium, rhodium, palladium, osmium, iridium, or platinum, or
        (2) a compound of a metal of A(1), where said compound is an oxide, sulfide, halide, nitrate, sulfate, carbonate or oxylate, and
    (B) a non-noble metal based catalyst of
        (1) chromium, silicon, germanium, cobalt, nickel, vanadium, molybdenum, tungsten or manganese, or
        (2) a compound of B(1) wherein said compound is iodide, bromide, chloride, nitrate, sulfate or sulfide,
    (C) the proportion of said catalyst mixture being in the range between about 0.01 and about 50 percent by weight of said aromatic nitro compound.

2. The process of claim 1 wherein the proportion of carbon monoxide is equivalent to a molar ratio of carbon monoxide to nitro groups in said aromatic nitro compound in the range between about 0.1:1 and about 50:1.

3. The process of claim 2 wherein the pressure is maintained in the range between about 100 and about 5000 p.s.i.g. and the temperature is maintained in the range between about 25° C. up to the decomposition temperature of said aromatic isocyanate.

4. The process of claim 3 wherein said temperature is between about 150 and 215° C.

5. The process of claim 1 wherein the weight ratio of said non-noble metal based catalyst to said noble metal based catalyst is in the range between about 0.1:1 and about 100:1.

6. The process of claim 1 wherein sulfur dioxide is added to the reaction mixture in a proportion equivalent to a molar ratio of sulfur dioxide per mole of said aromatic nitro compound in the range between about 0.05:1 and about 25:1.

7. The process of claim 1 wherein said aromatic nitro compound is selected from the group consisting of nitrobenzene, dinitrotoluene and bis(nitrophenyl)methane, and mixtures thereof.

8. The process of claim 7 wherein said catalyst mixture is a mixture of rhodium trichloride and vanadium.

9. The process of claim 7 wherein said catalyst mixture is a mixture of rhodium trichloride and nickel.

10. The process of claim 7 wherein said catalyst mixture is a mixture of rhodium trichloride and chromium trichloride.

11. The process of claim 7 wherein said catalyst mixture is a mixture of rhodium trichloride and cobalt iodide.

12. The process of claim 7 wherein said catalyst mixture is a mixture of palladium dichloride and chromium.

13. The process of claim 7 wherein said catalyst mixture is a mixture of palladium dichloride and chromium trichloride.

References Cited

UNITED STATES PATENTS

| | | | |
|---|---|---|---|
| 3,070,618 | 12/1962 | Drummond | 260—453 |
| 3,370,078 | 2/1968 | Bennett et al. | 260—453 |

FOREIGN PATENTS

| | | |
|---|---|---|
| 993,704 | 6/1965 | Great Britain. |
| 651,876 | 2/1965 | Belgium. |

CHARLES B. PARKER, Primary Examiner

D. H. TORRENCE, Assistant Examiner

U.S. Cl. X.R.

260—346.3, 243, 465, 543, 544, 644, 645, 646, 689; 252—440, 441, 447, 456, 458, 460, 464, 465, 466, 470, 472